Nov. 3, 1964 CHŪTA AIKAWA ETAL 3,155,793
ELECTROMAGNETIC RELAY FOR TELEPHONE PAY STATION
Filed Aug. 31, 1959 3 Sheets-Sheet 1
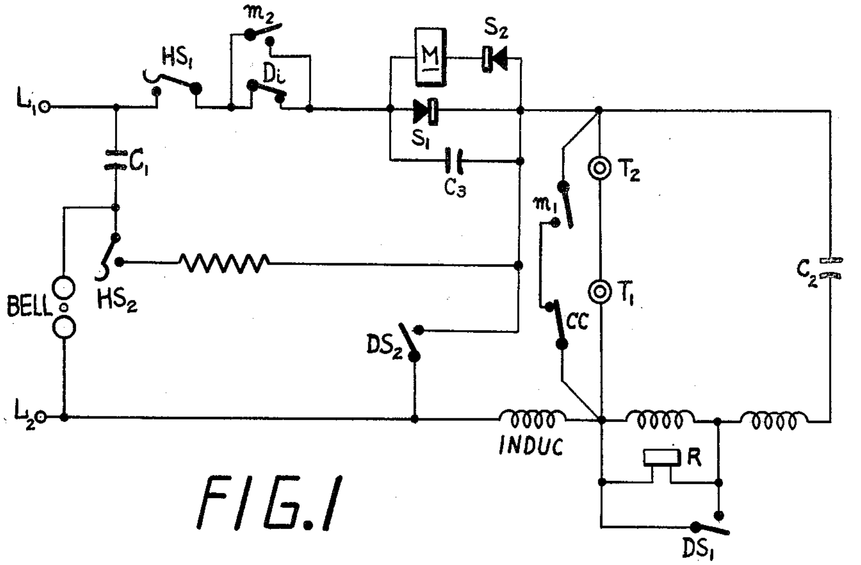
FIG. 1
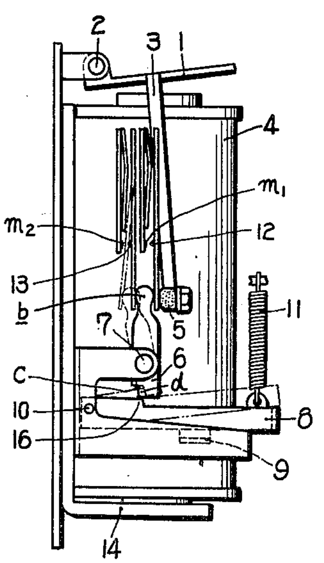
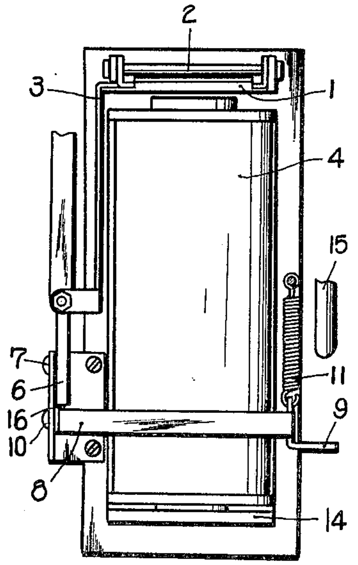
FIG. 2 FIG. 3
INVENTORS
CHŪTA AIKAWA
HIROSHI WATANABE
BY
Wenderoth, Lind & Ponack
Attys.

ELECTROMAGNETIC RELAY FOR TELEPHONE PAY STATION

Filed Aug. 31, 1959

INVENTOR.
CHŬTA AIKAWA
HIROSHI WATANABE
BY
Wenderoth, Lind & Ponack
Attys.

INVENTOR.
CHŪTA AIKAWA
HIROSHI WATANABE
BY Wenderoth, Lind & Ponack
Attys.

United States Patent Office 3,155,793

Patented Nov. 3, 1964

3,155,793

ELECTROMAGNETIC RELAY FOR TELEPHONE PAY STATION

Chūta Aikawa, Suginami-ku, Tokyo, and Hiroshi Watanabe, Meguro-ku, Tokyo, Japan, assignors to Kabushiki Kaisha Tamura Denki Seisakusho, Tokyo, Japan, a company of Japan Filed Aug. 31, 1959, Ser. No. 837,081
Claims priority, application Japan, Sept. 3, 1958, 33/25,047, 33/25,048; Sept. 4, 1958, 33/25,108
4 Claims. (Cl. 200—104)

This invention relates to a telephone paystation mechanism.

Generally, in order to better its function, a telephone paystation has several mechanisms which perform respective functions and which are so designed as not only to be related to each other, but also to perform each function in connection with the circuit of the telephone paystation.

The object of this invention is to provide a relay which operates by the battery reverse when the called party answers.

Another object of this invention is to provide a mechanism of a coin contact switch which operates by the action of deposited coin.

Still another object of this invention is to provide a mechanism of a coin contact switch which will not operate unless the prearranged number of coins, for instance, two or more, are deposited. That is to say, this is a mechanism which checks the prearranged number of coins deposited.

This invention will become more apparent to those skilled in the art by reference to the drawings hereto attached, wherein:

FIG. 1 is a circuit diagram of a circuit for using this invention in a "postpay" type telephone paystation for Strowger Exchange area use;

FIG. 2 is a side view of the locking device of a special mechanical lock relay of this invention;

FIG. 3 is the locking device and the release device of the relay shown in FIG. 2;

Figures 4, 6, 7, 8:
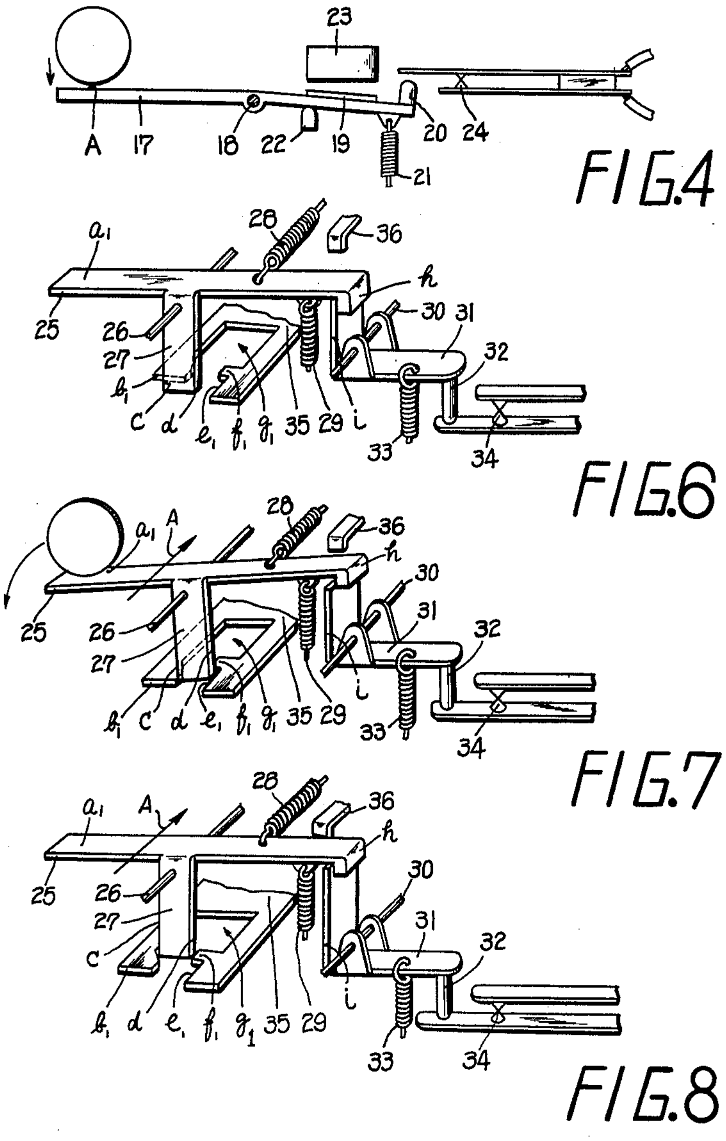
FIG. 4 is a diagrammatic showing of the mechanical principle of the coin lever of the coin contact switch of this invention.
FIG. 6 is a perspective diagrammatic view showing the normal condition of the contact switch device of this invention.
FIG. 7 is a perspective diagrammatic view showing the operating state, namely the first step of the operation of each part when the above-mentioned device is given an impulse by the first deposited coin.
FIG. 8 is a perspective diagrammatic view showing of the switch device when it has completed the first step of its operation under the action of the first deposited coin.
Figure 9:
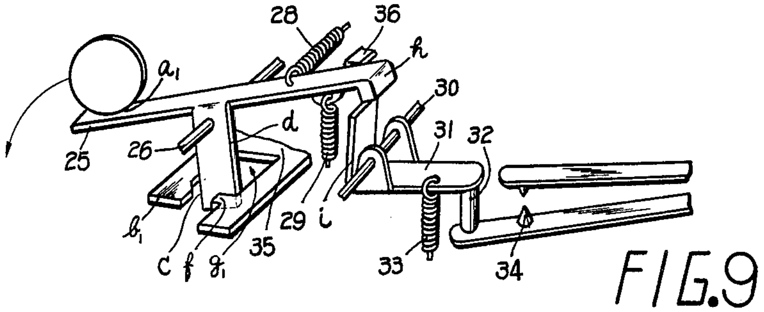
FIG. 9 is a perspective diagrammatic view showing the second step of the operation of each part of the above-mentioned device when it is given an impulse by the second deposited coin.

First, an explanation will be made of the case where a telephone paystation having the "postpay" type circuit shown in FIG. 1 is used together with the Strowger Exchange.

In FIG. 1, ($HS_1$) and ($HS_2$) are hook switch contacts which are opened by hanging up the handset and closed by lifting it up; ($Di$) is a dial impulse contact; (CC) is a coin contact switch which is operated and opened by the coins deposited, and is kept open mechanically until it is released by hanging up the handset; M is a relay, and ($m_1$) and ($m_2$) are the contacts thereof, said contact ($m_2$), however, being a special contact such that, when it begins operating, it is kept closed mechanically until the handset is hung up; ($S_1$) and ($S_2$) are rectifiers; ($C_1$), ($C_2$) and ($C_3$) are condensers; ($T_1$) is a transmitter; ($T_2$) is a telephone transmitter for sending out coin signals; (R) is a telephone receiver; (induc) is a primary winding of the induction coil; (Bell) is a ringer; and ($L_1$) and ($L_2$) are connecting terminals to the line wire, the same being connected to the line wire so as to make the ($L_1$) side positive with respect to ($L_2$).

In the case of an outgoing local call, when the handset is lifted up, ($HS_1$) and ($HS_2$) are closed, completing the following circuit:

$$(L_1)(+)-(HS_1)-(Di)-(S_1)-(T_2)-(T_1)-(\text{induc})-(L_2)(-) \quad (1)$$

With this circuit, the caller can listen to a dial tone and dial the number desired, and then the dial impulse is sent out by the following circuit:

$$(L_1)(+)-(HS_1)-(Di)-(S_1)-(DS_2)-(L_2)(-) \quad (2)$$

Next, when the called party answers, because, in the case of the Strowger Exchange, the reverse current is sent to this telephone set, relay M begins operating in the circuit shown below, thereby contacts ($m_1$) and ($m_2$) are closed, in which case, however, contact ($m_2$) alone is kept mechanically closed, composing the following circuit:

$$(L_2)(+)-(\text{induc})-\begin{bmatrix}(T_1)-(T_2)\\(CC)-(m_1)\end{bmatrix}-\begin{bmatrix}(S_2)-(M)\\(C_2)\end{bmatrix}-\begin{bmatrix}(Di)\\(m_2)\end{bmatrix}-(HS_1)-(L_1)(-) \quad (3)$$

Then, by the short-circuit thereof, i.e.

$$-(CC)-(m_1)- \quad (4)$$

transmitter ($T_1$) (inclusive of ($T_2$)) is short-circuited, with the result that the calling party can hear the called party but the called party cannot hear the calling party. Thereupon, if the prearranged numbers of coins are deposited, then the above-mentioned short-circuit (4) is cut off by the operation of coin contact (CC), so that talking becomes possible. The talking circuit in this case becomes as follows:

$$(L_2)(+)-(\text{induc})-(T_1)-(T_2)-\begin{bmatrix}(S_2)-(M)\\(C_3)\end{bmatrix}-\begin{bmatrix}(Di)\\(m_2)\end{bmatrix}-(HS_1)-(L_1)(-) \quad (5)$$

When the handset is hung up after talking is finished, all parts of the circuit are restored to the normal condition. Also, when the called party does not answer, the handset is hung up without depositing coins. Incidentally, in this case, the reason why only contact ($m_2$) short-circuiting contact ($Di$) must be kept closed mechanically is to prevent the telephone set from being illegally used, and this is a matter generally well known.

In the case of an incoming call, (Bell) rings and when the handset is lifted up, there is the momentary (approximately 60 millisecond) battery reverse current in the case of the Strowger Exchange. In that moment, relay M is operated by the above-mentioned circuit (3), and, in turn, contacts ($m_1$) and ($m_2$) are also operated, in which case contact ($m_2$) alone is locked closed mechanically. In the next moment, when the electric current flows again in the regular direction, relay M is restored to its normal condition, and, in turn, contact ($m_1$) is also released, but contact ($m_2$) still continues operating because it is kept locked mechanically. Accordingly, the talking circuit in this case becomes as follows:

$$(L_1)(+)-(HS_1)-\big[(Di)\ \|\ (m_2)\big]-(S_1)-(T_2)-(T_1)-(\text{induc})-(L_2)(-) \qquad (6)$$

In this case, for the reason that, as mentioned above, contact ($m_2$) must be locked mechanically in order to prevent illegal uses, if contact ($m_1$), too, is likewise locked mechanically, there arises the following inconvenience in the case of this incoming call.

That is to say, supposing that relay M is operated by the momentary battery reverse current at this time, and, in turn, contacts ($m_1$) and ($m_2$) are also operated and both are locked closed mechanically; in this case, said momentary battery reverse current disappears and the current begins flowing in the regular direction, thereby relay M is restored to its normal condition, but contact ($m_1$) still continues operating, so ($T_1$) is kept short-circuited in the above-mentioned circuit (4), thereby talking becomes impossible. If it is desired to talk, it is necessary, as in the case of the outgoing call, to cut off (CC) by depositing coins; otherwise, it is impossible to talk over the telephone.

The relay of this invention is so designed as to remove the inconvenience mentioned above by improving relay M in this type of telephone set, thereby making an incoming call practicable. Now, referring to the drawings, an explanation is made of the examples thereof, as follows:

In FIGS. 2 and 3, 1 is an armature and 2 is an armature pivot, said armature being provided with leg 3 fixed rigidly thereto. 4 is an electromagnet; 5 is an insulating plug fastened to the above-mentioned armature leg 3; 8 is a U-shaped locking lever which can rotate freely around the fixed pivot 10; 9 is a projecting piece for release use set in locking lever 8, and 11 is a spring provided so as to make locking lever 8 rotate in a counter-clockwise direction centering on pivot 10, said rotation of locking lever 8 in the counter-clockwise direction due to said spring 11 being prevented by the contact of another projecting piece 16 formed on said locking lever 8 with the lower end of locking member 6. Locking member 6 is made of insulating material and has an upper end part *b* which is held between contact springs ($m_1$) and ($m_2$) and which is pivoted so as to be able to rotate around the fixed pivot 7. Also, at the lower end of locking member 6, there is an L-shaped engaging part formed of the upper side *c* and the lower side *d*. 15 is a release rod, which, when the handset is hung up after talking is finished, comes downward and pushes down projecting piece 9 for release from locking member 6. Projecting piece 9 is fixed to U-shaped locking lever 8, and lever 8 is then made to rotate in the clockwise direction centering on pivot 10 against the tension of spring 11, thereby releasing the locking member 6. 14 is a yoke of this relay.

First, when electric current flows into electromagnet 4, armature 1 is attracted, allowing insulated plug 5 to push the contact spring 12 of contact ($m_1$) and the upper end *b* of locking member 6 as well as the contact spring 13 of contact ($m_2$), thereby closing said contacts 12 and 13. When the upper end *b* of locking member 6 is pushed, this locking member 6 rotates in the counter-clockwise direction centering on pivot 7, thereby the lower part *d* of locking member 6 is disengaged from the upper surface of projecting piece 16 of locking lever 8 and moves away from the vertical side of projecting piece 16, and said locking lever 8 rotates in the counter-clockwise direction centering on pivot 10 due to the force of spring 11, and the upper surface of projecting piece 16 strikes against the lower end *c* of locking lever 6, at which point the locking lever 8 stops. This is the talking condition in the case of local calls.

Next, when electric current is cut off with the parts in this condition and the attractive force of electromagnet 4 ceases to exist, armature 1 is pushed by the contact spring 12 of contact ($m_1$) and is restored to its initial position by movement in the counterclockwise direction, so that said contact ($m_1$) is broken, but contact ($m_2$) is still kept in the closed condition because the lower part *d* of locking member 6 is engaged with projecting piece 16 of locking lever 8 and is kept in this position mechanically. This is the operating condition for talking in the case of incoming calls, that is, the condition shown in dotted lines in FIG. 2.

In the case of resetting from the above-mentioned operating condition, if the handset is hung up, then release rod 15 pushes down projecting piece 9, making locking lever 8 rotate in the clockwise direction around pivot 10 against the tension of spring 11, thereby releasing the lower part *d* of locking member 6 which has been held by projecting piece 16 of said locking lever. Then, locking member 6 is turned in the clockwise direction by the contact spring of contact 13, and, at the same time, contact 13, too, is opened.

If the above-described relay is used as relay M of the circuit shown in FIG. 1, because, in the case of local calls, the reverse current coming from the Exchange is constantly kept flowing in from the time the called party answers up to the time talking is finished, short-circuit (4) is maintained as long as coins are not deposited, so that mutual talking is impossible. Also, at the time of incoming calls, short-circuit (4) occurs only momentarily at the lifting up the handset, but, thereafter, when the current goes back to the regular direction, contact ($m_1$) opens, releasing the short-circuit of telephone transmitter ($T_1$), and, therefore, talking becomes possible. In the case of local calls, and, also, even in the case of incoming calls, contact ($m_2$) is, once it is closed, mechanically kept in that condition unless the handset is hung up, thereby short-circuiting contact (*Di*) and thus preventing free illegal calls after talking is finished.

By resorting to the present relay, it is possible to select two or more sets of contacts which are closed simultaneously by an electromagnet and then to open each contact separately, so that, by using this relay in a telephone paystation for Strowger Exchange area use, the station can freely receive incoming calls, thereby strikingly bettering the function of a telephone paystation.

Figure 5:
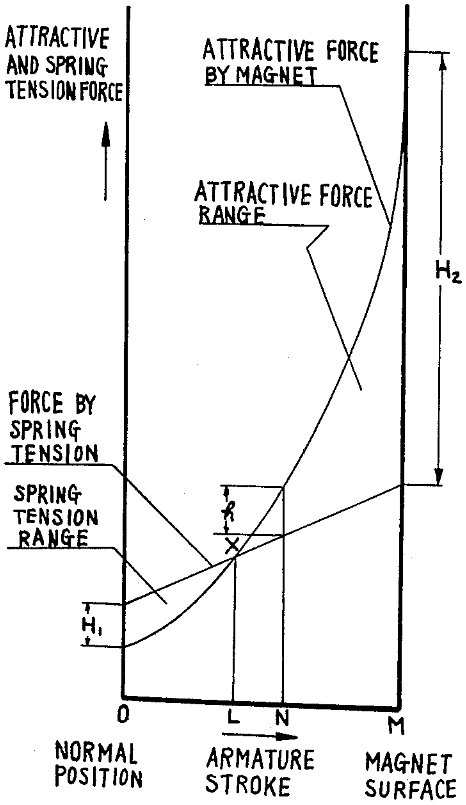
FIG. 5 is a chart showing the relationship between the force acting on the above-mentioned coin lever and the distance through which the lever moves.

FIGS. 4 and 5 are, respectively, a diagrammatic illustration of the coin contact switch mechanism shown in FIG. 1 which is operated and opened by the deposited coins and is kept open mechanically and which is released by hanging up of the handset, and a graph showing the relationship between the tension of the spring and the attractive force of the magnet in said mechanism.

A coin contact operating apparatus used in the conventional telephone paystation is composed of a single combination of a movable coin lever, a spring and an electrical contact, so that such a coin lever is devoid of accuracy in operation against a slight force. The present invention provides a simple construction, and eliminates the defects heretofore present. The coin contact switch mechanism according to the figures has a movable coin lever which is so designed as to be able to rotate centering on pivot 18, said coin lever 17 having armature 19 and insulating plug 20 fastened thereto, and it is held by spring 21 so as to be able to rotate in the clockwise direction and is maintained in the normal condition by stop 22. 23 is a magnet provided in order to attract armature 19, and its attractive force acts in a direction opposite to the tension of spring 21, so that the magnetic force and the spring tension tend to negate each other. 24 is an electrical contact switch which is closed in the normal condition. Further, the elastic characteristic of spring 21 pulling coin lever 17 in the clockwise direction is linear, whereas the force of magnet 23 attracting armature 19 varies inversely as the square of the distance between the magnet and the armature, and, therefore, the tension of spring 21 and the attractive force of magnet 23 can be properly combined and selected so as to have the relationship as shown in FIG. 5. ($H_1$) is the holding power when coin lever 17 is held in the normal position, and it is composed of the tension of the spring less the attractive force of the magnet with the armature in its normal position. ($H_2$) is the attractive force when coin lever 17 is attracted by magnet 23, and it is composed of the attractive force of the magnet when the armature is in the attracted position less the tension of spring 21.

Also, dead point X is a point where the tension of spring 21 and the attractive force of magnet 23 offset each other.

When the deposited coins strike the part A of coin lever 17, then, by the impulse thereof, coin lever 17 is turned around pivot 18 in the counter-clockwise direction against the resistance of spring 21, and, as shown in FIG. 5, armature 19 moves towards magnet 23, and, as it gets near the dead point X, the tension of spring 21 is overcome by the attractive force of magnet 23, so that, even with the application of a slight force, the armature moves out of the range in which the tension of spring 21 prevails into the range in which the attractive force of magnet 23 prevails, and, once it moves into this range, armature 19 is, during the final stages of its movement, attracted more and more strongly by the attraction of magnet 23 without any relation to the impulsive force of the coins until at last it has been completely attracted by magnet 23, permitting insulating plug 20 to push open electrical contact switch 24 and keeping that condition. The release of armature 19 is carried out mechanically by means of an external force which releases the hook of the telephone set.

As mentioned above, according to this invention, coin lever 17 operates accurately under only a slight external force and will be maintained in the actuated condition, so that, as a coin contact operating mechanism in a telephone paystation, it always makes coin contacts operate accurately under a slight impulsive force of coins, thereby completely eliminating the defects in operation, etc. heretofore incurred.

Next there will be explained, with reference to FIGS. 6–10, the mechanism which checks the prearranged number of the deposited coins and then operates the coin contact switch. When a local call can be effected with one coin, for instance, a 10 cent coin, and when it is intended to make a local call by using two coins having the same currency value, for instance, two 5 cent coins, in the same manner as using one 10 cent coin, there arises the necessity of first checking, inside the telephone paystation, whether the prearranged two 5 cent coins have been deposited or not, and then operating the coin contact switch. This necessity is fully met by the mechanism of this invention; that is, on a fixed pivot is mounted a coin lever which, under the impulse of the deposited coins, rotates around said fixed pivot and, at the same time, also moves through a first step, a second step and so on in the axial direction; on this coin lever is provided a latching leg which is connected with a multi-step latching member fastened at another place; the rotary angle through which said coin lever rotates due to the impulse of the coins is controlled to a certain limit until the prearranged members of coins are all deposited, so that the contact pushing lever does not operate the electrical contact switch. However, when the last one of the prearranged number of coins is deposited, the coin lever rotates more widely than the limit to which it had been held, thus operating the electrical contact switch through the contact pushing lever. Thus, this mechanism first checks whether the prearranged number of coins has been deposited and then operates the electrical contacts for the first time. Of course, in case the deposited coins are less than the prearranged number, said electrical contact switch does not operate. In either of the above-mentioned cases, the coin lever, if it has properly deposited thereto a force in two directions, is restored to its normal condition.

In the case of telephone paystations, the release is effected by applying these forces through a certain mechanism by means of the hanging up of the handset.

Figure 10:
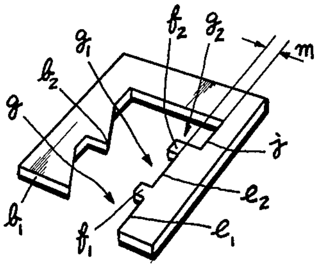
FIG. 10 is a perspective view of a step-type latching member which can be used in the above-mentioned device when 3 coins are to be deposited.

The specific embodiment herein described is for the case where this mechanism is used when telephone transmitter ($T_1$) is kept short-circuited by the electrical contact switch, and this short-circuit of the telephone transmitter is released by the dropping of the prearranged number of two coins, thereby making the talking possible. 25 is a coin lever, which is mounted on shaft 26 in such a manner that it can freely move along said shaft to the axial direction as well as in the rotary direction thereof, said coin lever 25 being provided with a hook-shaped part $h$ at its one end and with latching leg 27 at its center and being urged in the direction of arrow A and in the clockwise direction respectively by springs 28 and 29. Contact pushing lever 31 which can rotate around pivot 30 has insulating plug 32 mounted on the end thereof one end part $i$ of said contact pushing lever 31 being, in the normal condition, locked as shown in FIG. 6 and urged by spring 33 in the clockwise direction, and electrical contact switch 34 is closed. When the coin first deposited strikes the part $a_1$ of coin lever 25, this lever 25 is, by the impulsive force thereof, turned momentarily in the counter-clockwise direction against the tension of spring 29, whereby the part $c$ of latching leg 27 is disengaged from the part $b_1$ of multi-step latching member 35 and the part $d$ comes in contact with the part $e_1$ of latching number 35, and, at the same time, coin lever 25 is pulled by spring 28 in the direction of arrow A, whereby the part $d$ of latching leg 27 is locked against the second latching part $f_1$, the condition then becoming as shown in FIG. 7. The part $i$ of contact pushing lever 31 remains half locked to the hook-shaped part $h$ of coin lever 25. When the coins fall down from coin lever 25, this lever 25 is pulled by spring 29, whereby the part $d$ of latching leg 27 is disengaged from the second latching part $f_1$ and, simultaneously, it is pulled by spring 28 and moves in the direction of arrow A until it hits against stop 36, that is, the condition at this time becomes as shown in FIG. 8. 36 is a stop which controls the movement of the coin lever in the direction of arrow A. At this time, latching leg 27 has already come into the cavity $g_1$ of the multi-step latching member. Then, when the coin is deposited for the second time, coin lever 25 is, by the impulse thereof, again turned in the counter-clockwise direction, but in this case, because latching leg 27 which has already entered the cavity $g_1$ of multi-step latching member is not obstructed by anything, the coin lever rotates freely in the counter-clockwise direction, whereby the hook-shaped part $h$ is disengaged from the part $i$ of contact pushing lever 31, which lever 31 is then turned in the clockwise direction by spring 33, permitting insulating plug 32 mounted thereon to open electric contact switch 34, whereby the talking becomes possible. The releasing is effected by means of the hanging up of the handset; that is, when the handset is hung up, contact pushing lever 31 is caused to rotate in the counter-clockwise direction around pivot 30, then, in turn, the part $i$ and the part $h$ are separated from their overlapped condition (FIG. 9) and, after coin lever 25 is turned around shaft 26 in the clockwise direction by spring 29 until latching leg 27 strikes against the left end of cavity $g_1$, latching leg 27 is pushed out along the left end of cavity $g_1$ in the direction opposite to the direction of arrow A so as to effect the releasing when a force in the direction opposite to the arrow A is given to this coin lever 25. As mentioned above, the mechanism is so designed that the electrical contact switch will not operate unless the prearranged number of coins, two in this case, are deposited. When the number of coins is prearranged at three or four, all that is necessary is to provide latching member 35 with two or three steps. FIG. 10 shows a two-step latching member to be used when the prearranged number of coins is three. Accordingly, by resorting to this mechanism, it is possible to check prearranged numbers of coins as desired and then to operate the electrical contact switch.

FIG. 10 shows a 2-step latching member for use when the prearranged number of coins is three as mentioned above. This latching member has cavities $g$, $g_1$, $g_2$, and latching parts $b_1$, $b_2$ and $f_1$, $f_2$. Assuming that the right end of cavity $g$ or $g_1$ is $e_1$ or $e_2$, and the right end of cavity $g_2$ is $j$, the difference $m$ between $e_1$ (or $e_2$) and $j$ will require a larger rotating angle of the coin lever, which can not be obtained without depositing the prearranged number of coins. The larger rotating angle of the coin lever causes the coin contact switch to be operated.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multiple contact relay comprising an electromagnet, an armature movable toward said electromagnet when said electromagnet is energized, at least a first spring contact switch and a second spring contact switch, said first spring contact switch being engaged by said armature for being closed when said armature is moved toward said electromagnet and which opens and urges said armature away from said electromagnet when said electromagnet is deenergized, an actuataing member engaged between said first and second switches for closing said second switch when said first switch is closed, and locking means engageable with said actuating member and holding said actuating member in engagement with said second switch to hold said second switch closed when said armature closes said first switch.

2. A multiple contact relay as claimed in claim 1 in which said armature comprises an arm of magnetizable material pivoted to said electromagnet, a leg depending from said armature and having an insulating member on the free end thereof, said spring contact switches each comprise a spring arm having a contact thereon and having one end fixed relative to said electromagnet and a fixed arm having a second contact thereon opposed to the contact on said spring arm, said insulating member on said armature leg bearing against the free end of the spring arm of said first switch, and said actuating member being an insulating piece positioned between the free ends of the spring arms of said switches and moving the spring arm of said second switch when said armature leg moves the spring arm of said first switch.

3. A multiple contact relay as claimed in claim 2 in which said locking means comprises a locking lever pivoted to said electromagnet, said actuating member being pivoted to said electromagnet, said locking lever having a notch therein engageable with the end of said actuating member remote from said switches when said actuating member is pivoted to close said second switch, and a ring means connected to the free end of said locking lever urging said locking lever toward said actuating member.

4. A multiple contact relay as claimed in claim 3 in which said locking lever has an arm thereon adapted to be engaged by a reset means to pivot said lever against the action of said spring means.

References Cited in the file of this patent

UNITED STATES PATENTS

| | | |
|---|---|---|
| 1,667,915 | Wicks | May 1, 1928 |
| 2,295,881 | Wheelock | Sept. 15, 1942 |
| 2,617,906 | Stehlick | Nov. 11, 1952 |
| 2,674,655 | Gallagher | Apr. 6, 1954 |
| 2,681,961 | Sengenbusch | June 22, 1954 |
| 2,707,724 | Gallagher | May 3, 1955 |
| 2,735,910 | Dantry | Feb. 21, 1956 |
| 2,755,356 | Jucker | July 17, 1956 |
| 2,804,502 | Iwema | Aug. 27, 1957 |